United States Patent [19]

Ellenberger et al.

[11] Patent Number: 4,923,558
[45] Date of Patent: May 8, 1990

[54] DEVICE FOR THE WELDING OF PLASTIC FOIL

[75] Inventors: Bernd Ellenberger, Gonbach; Friedrich Jennet, Kaiserslautern; Karlheinz Schäfer, Neustadt/Weinstrasse; Rainer Spickermann, Thaleischweiler; Gerhard Lass, Enkenbach-Alsenhorn, all of Fed. Rep. of Germany

[73] Assignee: Pfaff Industriemaschinen, GmbH, Kaiserslautern, Fed. Rep. of Germany

[21] Appl. No.: 283,207

[22] Filed: Dec. 12, 1988

[30] Foreign Application Priority Data

May 2, 1988 [DE] Fed. Rep. of Germany ... 8805783[U]

[51] Int. Cl.$^5$ ............................................. B32B 31/08
[52] U.S. Cl. .................................. 156/499; 100/171; 156/358; 156/555
[58] Field of Search ................... 156/499, 555, 358; 100/93 RP, 168, 171; 226/176, 177, 181

[56] References Cited

U.S. PATENT DOCUMENTS

| 2,643,475 | 6/1953 | Klopfenstein | 100/171 |
| 3,901,758 | 8/1975 | Humphries | 156/555 X |
| 3,925,139 | 12/1975 | Simmons | 156/358 |
| 4,146,419 | 3/1979 | Neidhart | 156/499 X |
| 4,233,997 | 11/1980 | Quester et al. | 100/171 X |
| 4,655,872 | 4/1987 | Neumuller et al. | 156/499 |

Primary Examiner—David Simmons
Attorney, Agent, or Firm—McGlew & Tuttle

[57] ABSTRACT

A device for welding plastic foil strips together with a heating device and a pair of pressure rolls between which the strips are fed, includes a pressure device supported by a spring mechanism for one of two pressure rolls. The pressure device includes a first regulating mechanism for the setting of the width of the gap between the two pressure rolls and a second regulating mechanism for the setting of the welding pressure which is arranged on the first regulating mechanism and which can be moved by it. The regulating units of the two regulating mechanisms are two interacting eccentric elements. This leads to a compact design and only little force is necessary for the setting of the welding pressure.

6 Claims, 3 Drawing Sheets

DEVICE FOR THE WELDING OF PLASTIC FOIL

BACKGROUND OF THE INVENTION

1. Field of the Invention

The invention relates, in general, to devices for joining strips of material together and, in particular, to a new and useful device for welding plastic foil strips together as they are fed into juxtaposition with overlapping edges.

U.S. Pat. No. 4,146,419 shows a device for the welding of plastic foils overlapping at their edges. It includes a heating edge for the heating of the overlapping foil edges, a front pair of pressure rolls and a rear pair of pressure rolls. The upper pressure roll of each pressure roll pair are each mounted on an angle lever. A pressure spring arranged between the angle levers, which are adjustable by turning a set screw, presses the upper pressure rolls against the lower pressure rolls, thus creating the pressure necessary for the welding of the softened foil edges.

A major disadvantage of this device is that when new foils are inserted between the pressure roll pairs, the angle levers have to be moved manually against the tension of the pressure spring to open a gap sufficiently wide for the insertion of the foils between the upper and the lower pressure rolls. The welding pressure is comparably high for strong foils and therefore the required force has to be high. The operator has to exercise relatively strong force to move the angle lever. The force required is even increased by the fact that angle levers have to be moved further for the insertion of strong foil than for thin foil.

SUMMARY OF THE INVENTION

The invention provides a device for the welding of plastic foil wherein the opening for the insertion of the foil and the necessary pressure for the welding can be set without exertion.

A pressure exercising device supported by a spring mechanism includes a first regulating mechanism and a second regulating mechanism mounted to and moveable with the first regulating mechanism. The first regulating mechanism sets the width of the gap of the pressure roll pair while the spring mechanism is relaxed. The arrangement can be adjusted to the respective thickness of the foil without major expenditure of force.

The setting of the width of the gap is best selected so that the ends of the foil can be inserted easily into the gap between the pressure roll pair. Once the edges of the foils are inserted into the gap, the required welding pressure is set via the second regulating mechanism. The total regulating distance of the pressuring device includes the regulating distances of the two regulating mechanisms which are therefore smaller than the total regulating distance of the pressuring device. Therefore the force required for the setting of the welding pressure is smaller due to the smaller distance than in a device like the one described in U.S. Pat. No. 4,146,419 which has only a single regulating mechanism for the setting of the pressure roll gap and the welding pressure.

According to one embodiment, the regulating elements of the regulating mechanisms are eccentric elements which are combined in one unit. This results in a space-saving design and in a short and therefore speedily effected movement due to a maximal rotation angle of the regulation range of 180°.

According to another embodiment, a single handle, preferably a lever, is allocated to both regulating mechanisms. In the engaged position with the binding screw of the eccentric shaft being loosened the lever serves for the setting of the first regulating mechanism. In the disengaged position with the eccentric shaft being fastened, the lever serves the purpose of setting the second regulating mechanism.

An indicator for the setting of the welding pressure is given by providing the flange connected with the eccentric shaft with a scale and by providing the lever or its holding device with a pointer or a mark. The indicator moves as a whole when the first regulating mechanism is used and it is active only when the second regulating mechanism is used, i.e. the changing angle of the eccentric element of the second regulating mechanism with regard to the now stationary eccentric shaft of the first regulating mechanism, is indicated.

In one embodiment, it is possible to keep the pressure rolls parallel to each other even at varying welding pressure. The continuously working force measuring device allows the control of the set pressure even during the welding process.

Accordingly, it is an object of the invention to provide an improved device for welding plastic strips together, as they are moved into an overlapping relationship adjacent a heating device for welding them together and which comprises a pair of pressure rolls between which the foils are fed and which are supported by a spring mechanism and which includes a first regulating mechanism for setting the width of the overlapping gap and a second regulating mechanism for regulating the welding pressure which is arranged on the first regulating mechanism and which can move with it.

A further object of the invention is to provide a device for welding plastic foils which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIG. 5 is a projection of the swivelable ball bearing;

FIG. 6 is a sectional view of the swivelable ball bearing.

DESCRIPTION OF THE PREFERRED EMBODIMENTS

Figure 1:
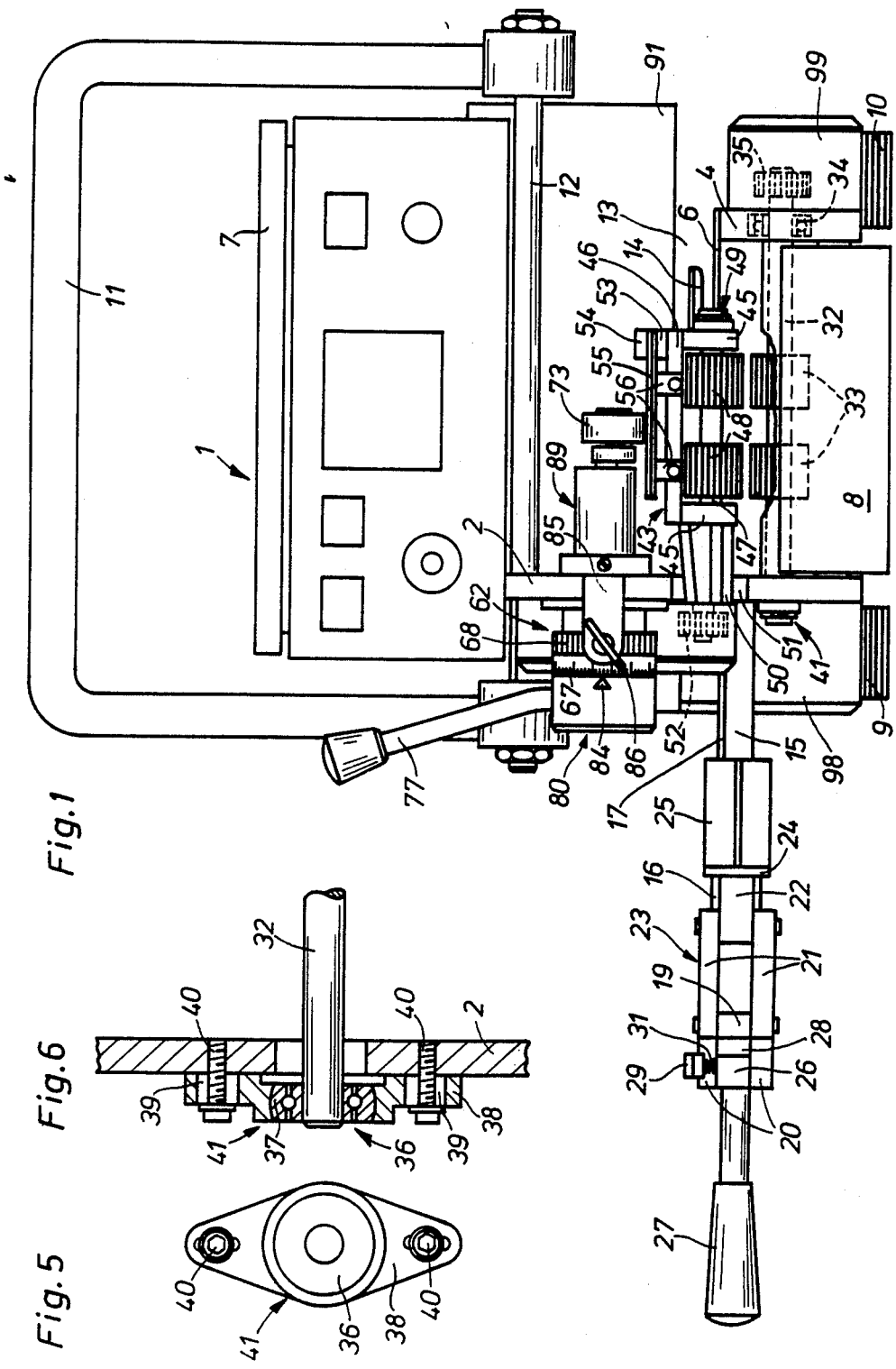
FIG. 1 is an elevational view of a projection of a welding unit constructed in accordance with the invention with the heating wedge pulled out to the side.

Referring to the drawings, in particular, the invention embodied therein comprises a device for welding plastic foils together as they are moved into edge overlapping relationship adjacent the heating device for heating the foil parts to be welded together comprises which device a pair of first and second movable pressure rolls 48 and 33 between which the foils are moved. The pressure rolls are subjected to a welding pressure and they are mounted to a carrier so that they may be moved relative to each other for adjustments in the width of a gap therebetween. The carrier 43 is allocated to a pressure device 9 which is supported by a spring mechanism 55. The pressure device 89 has a first regulating mechanism 87 for the setting of the width of the overlapping gap. The spring mechanism 55 is relaxed and a second regulating mechanism is provided for regulating the welding pressure which is arranged on the first regulating mechanism 87 and can move with it. The spring mechanism 55 comprises a leaf spring bundle or support springs 55 which provides a support for the pressure device 89.

The welding unit has a housing 1 which includes a vertically positioned high base plate 2 with a set-off 3, a vertical low base plate 4 with a set-off 5, a transverse 6 connecting the two base plates 2 and 4 and a controlling unit 7. A freely rotatable transport roller 8 is mounted on the set-offs 3 and 5. At the opposite end of the housing 1 two actuated transport rolls 9 and 10 are arranged with distance to each other. The welding device can be operated by means of a rectangular-shaped handle 11 which is fixed adjustably to a bar 12 in the housing 1.

Two guidance gaps are arranged in the housing 1 for the reception of two foils overlapping at the edges. Of those only the upper guidance gap 13 (FIG. 1), which extends above a fixed flat guidance plate 14, is shown. A sleeve 16 is arranged coaxially moveable on a bar 15 which is fixed in the housing 1 and protrudes transversely. The sleeve 16 is secured against rotation by a feather key 17 and a respective guidance groove in the sleeve 16, which is not shown. A stop disc 18 is fixed to the free end of the bar 15.

A horizontally extending carrying device 19 is mounted to the sleeve 16 and two pairs of oscillating cranks 20 and 21 are fixed to the device. The two pairs of oscillating cranks 20, 21, a coupler connecting them and the carrying device 19 form a parallel crank mechanism 23. The above mentioned, electrically heatable heating wedge 25 is removably connected to a holder 24 on the coupler 22.

Figure 2:
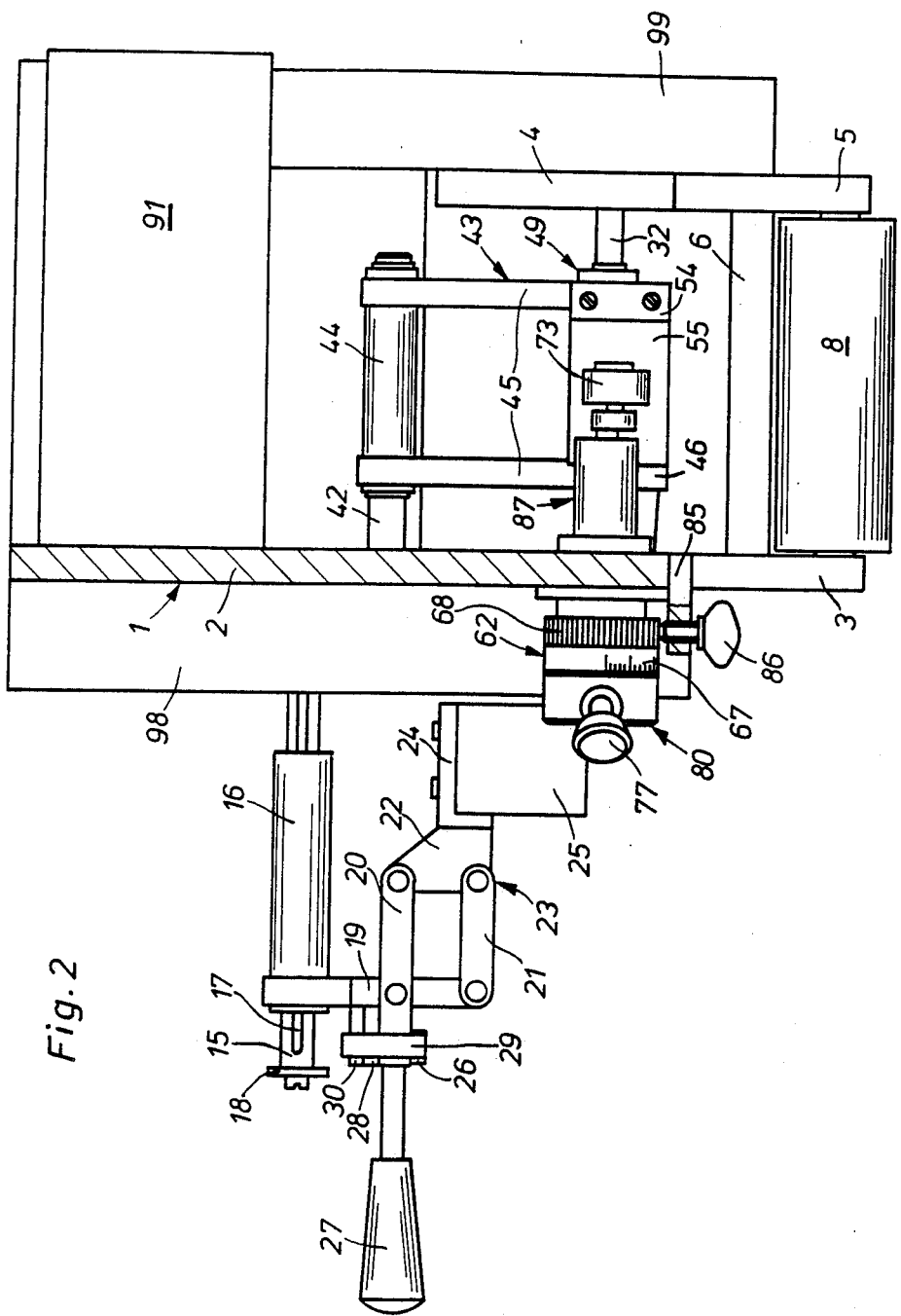
FIG. 2 is a top view of the partially cut lower part of the welding unit.

The pair of oscillating cranks 20 has two arms which are fixedly connected through a web segment 26. A handle 27 is attached to the web segment 26. In the position of the parallel crank mechanism 23 shown in FIG. 2 the web segment 26 touches a set-off 28 mounted to the carrying device 19 which is a limit stop to a horizontal swing of the handle 27 in clockwise direction. The position of the parallel crank mechanism 23 is secured by a catch 29 which interacts with the relief edge 30 of the set-off 28 and which is kept in the interlocked position by a pressure spring 31 supported by the web segment 26.

A transverse shaft 32 carrying a pressure roll is mounted in the two base plates 2 and 4. The shaft is mounted in one of the fixed ball bearings 34 in the base plate 4 and has a pinion 35 at its end which extends beyond the base plate. The other end of the shaft 32 (FIGS. 2 and 6) is mounted to the base plate 2 in a ball bearing 36 whose outer race ring 37 is shaped hemispherically on the outside and set in a correspondingly shaped holder 38. Set screws 40 go though horizontal oblong holes 39 in the holder 38. The height of the holder 3 can be adjusted on the base plate 2 by means of the screws 40. The ball bearing 36 which can be swivelled in the holder 38 forms a swivelable ball bearing with the holder.

An axis 42 (FIG. 2) protrudes transversely from the base plate 2 and is mounted in it. A swivelable frame 43 includes a bearing bush 44, two legs 45 being fixed to the bearing bush 44 and a web plate 46 connecting the legs 45. It serves as a support for the axis 42 to which it is mounted. The two legs 45 carry a shaft 47 which runs transversely and carries a pressure roll 48. The longitudinal axes of the two shafts 32, 47 run basically at a mutual vertical level. As shown in FIG. 1, the shaft 47 is mounted in the right leg 45 in an adjustable, swivelable ball bearing 49 which is designed like the pivotal ball bearing 41. Furthermore, the shaft 47 is mounted in a ball bearing (not shown) in the set-off 50 on the left leg 45 which sticks out though a cut out opening 51 in the base plate 2 is fixed to the end of the shaft 47 protruding from the base plate 2.

The end of a leaf spring bundle 55 forming a spring mechanism is arranged on the web plate 46 of the pivotal frame or carrier 43 with a separator 53 and a clamp 54. The leaf spring bundle 55 is supported by two separators 56 which are arranged in spaced relationship on the web plate 46.

Figure 4:
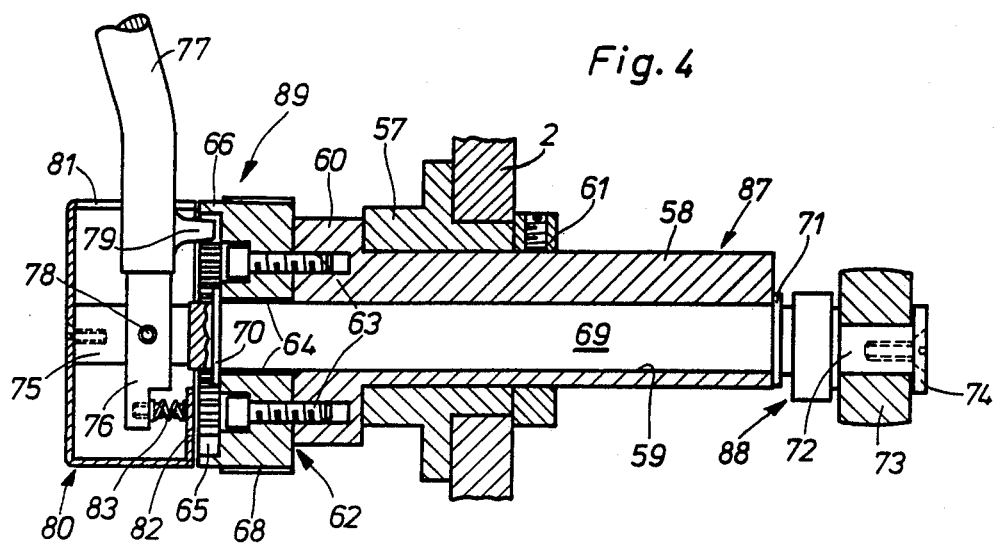
FIG. 4 is a sectional view of the pressing device.

In a bearing bush 57 fixed in the base plate 2 an eccentric shaft 58 is mounted rotatably (FIG. 4). The eccentric shaft 58 has an eccentrically positioned boring 59 and a coaxial neck 60. The eccentric shaft 58 is axially secured by the neck 60 sitting close to the bearing bush 57 and by the clamping ring 61 sitting close to the side of the base plate 2. A flange 62 showing a boring 64 which is marginally larger than the boring 59 and facing it, is fixed to the neck 60 by screws 63.

The outer face of the flange 62 has an annular toothing 65, which is enclosed by an annular section 66. The surface of the annular section 66 has a scale 67. The outside of the flange 62 has a knurl 68. A regulating shaft 69 held axially by two securing rings 70, 71 is mounted in the boring 59. One end of the regulating shaft 69 has an eccentric shaft journal 72, which carries a freely rotatable pressure roll 73 secured axially by a stopper disc 74. The other end of the regulating shaft 69 has a gap (not shown) running vertical to its longitudinal axis which separates the end of the regulating shaft in two segment sections 75. The flattened end piece 76 of a lever 77 is mounted between the two segment sections on a pin 78. The lever 77 has a dent-shaped stopper 79 which protrudes transversely from the lever and which can engage in the gashes of the toothing 65. A cup-shaped lid with a sparing 81 for the lever 77 and an inward-bent lap 80 is screwed to the face of the two segment sections 75. A pressure spring 83 arranged between the lap 82 and the end piece 76 keeps the stopper 76 in engagement with the toothing 65. The surface of the lid 80 has a mark 84 which is assigned to the scale 67.

The base plate 2 has a transversely protruding holding plate 85 for a binding or holding screw 86 which can be fastened against the knurl 68 of the flange 62. The flange 62 with the eccentric shaft is secured against turning by the fastening of the binding screw 86 against the knurl 68. In this case only the regulating shaft 69 can be turned, but only once the stopper 76 has been disengaged from the toothing 65 by turning the lever 77 around the pin 78. When the binding screw 86 is loose the flange 62 and the eccentric shaft 58 are rotatable.

For the rotation of the eccentric shaft 58 the stopper 79 remains engaged with the toothing 65. Thus, the regulating shaft 69 is rotated with the flange 62 and the eccentric shaft 58 when the lever 77 is rotated around the longitudinal axis of the regulating shaft 69.

A first regulating mechanism 87 is formed by the eccentric shaft bushing 58, the flange 62 and the lever 77 with the stopper 79 engaged in the toothing 65. A second regulating mechanism 88 is formed by the regulating shaft 69, which is mounted in the eccentric shaft bushing 58 (and which can be moved with it, but which can also be rotated separately when the flange 62 is fastened and the stopper 79, the eccentric shaft journal 72, the pressure roll 73 and the lever 77 are disengaged. The elements 57 to 86 form a pressure device 89.

Figure 3:
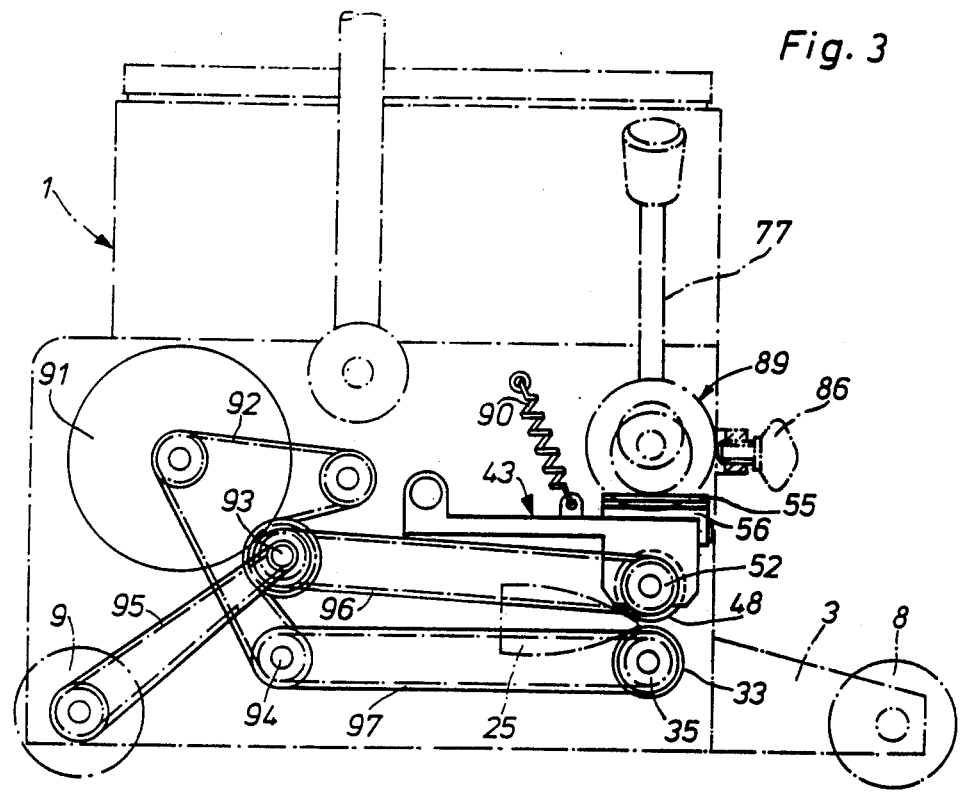
FIG. 3 is a lateral view of the actuation mechanism for the pressure and transport rolls.

A draw spring 90 shown in FIG. 3 which is connected to the base plate 2 as well as to a pivotal frame 43, pulls the pivotal frame 43 upwards and thus keeps the leaf spring bundle 55 in constant contact with the pressure roll 73.

The housing 1 has a motor 91 which drives two shafts 93, 94 via a chain drive 92. A chain drive 95 which drives the transport rolls 9, 10 is activated via the shaft 94. The shaft 93 drives the pinion 52 via a chain drive 96. The shaft 94 drives the pinion 35 via a chain drive. The chain drives 92, 95 and 96 are covered by a removable sheeting 98. The chain drive 97 is covered by a sheeting 99.

The welding device functions as follows: The welding device is designed for the welding of overlapping seams of plastic foils from 1 mm to ca. 4 mm. Therefore the total thickness is 2 mm to 8 mm depending on the foil to be treated. Due to this range a fundamental resetting of the width of the gap between the pressure rolls 33 and 48 may be necessary.

For this purpose the binding screw 86 is loosened and the lever 77 is rotated around the longitudinal axis of the regulating shaft 69 while the stopper 79 remains engaged with the toothing 65. Thus the flange 62 is rotated with the eccentric shaft 58 and with the regulating shaft 69 having an eccentric journal 72. Both regulating mechanisms 87, 88 are moved at the same time. Depending on the direction in which the lever 77 is rotated, the gap between the two pressure rolls 33, 48 is reduced or increased. The leaf spring bundle 55 is free of load and the relatively weak draw spring 90 is stretched when the width of the gap increases. Therefore a decrease in the width of the gap is achieved without the use of any noteworthy force, while an increase in the width of the gap is even supported by the force of the draw spring 90 working in the same direction.

The width is set so that the edges of the overlapping foils can be inserted easily into the gap between the two pressure rolls 33 and 48.

After the width the welding pressure needed for the welding process is set. To this effect the foils are inserted between the pressure rolls 33, 48. The binding screw 86 is fastened and therefore the flange 62 with the eccentric shaft 58 is secured against further rotation. The lever 77 is rotated around the pin 78 and therefore the stopper 79 is disengaged from the toothing 65. As soon as the drive type fastening between the two regulating mechanisms is released, the lever 77 is rotated around the longitudinal axis of the regulating shaft 69 so that the eccentric shaft journal 72 presses the pressure roll 48 against the pressure roll 33 onto the foil via the pressure roll 73, the leaf spring bundle 55 and the swivelling frame.

The known experimental pressure or the value found by trial welding can be reproduced relatively accurately by means of the scale 67. An even more accurate method of setting the welding pressure is the equipment of the pressure device 89 with a known force measuring device which shows the set pressure force during the welding process. For this purpose a sensor in the shape of a wire strain gauge (not shown) is mounted to the web plate 46. Its resistance value changes with changing load and can be transformed into a digital force indicator e.g. by means of the circuit known from German Patent No. 3516 366. When the lever 77 is released, the draw spring 83 pulls it clockwise as shown in FIG. 4. Thus the stopper 79 reengages with a gash in the toothing 65 and the lever 77 is arrested.

The leaf spring bundle 55 arranged between the pressure roll 73 and the swiveling frame 43 allows the upper pressure roll 48 to yield upward elastically should thickening occur in the foil.

The welding pressure depends on the thickness, the hardness and the width of the seam and varies usually between 200–500 N. Therefore considerable variations in the strain of the parts of the device admitted with pressure can occur. Deviations from the parallelism of the two shafts 32, 47 carrying the pressure rolls 33, 48 can occur. For the paraxial adjustment of the pressure rolls 33, 48 the set screws 40 of the swivelable ball bearings 41, 49 are loosened briefly. The pressure rolls 33, 48 readjust with regard to each other.

Once the welding pressure is set, the heating wedge 25 which has been heated up to the required temperature is positioned in the welding position. For this purpose the catch 29 is released and the heating wedge 25 is rotated via the handle 27 toward the bar 15. The sleeve 16 is moved on the bar 15 by means of the parallel crank mechanism 23 and the heating wedge 25 is moved into the housing 1. As soon as the sleeve 16 has reached its end position the heating wedge 25 is swivelled via the handle 27 towards the pressure rolls 33, 48. When the welding position of the heating wedge is reached, the catch 29 engages with the relief edge 30 and arrests the position of the parallel crank mechanism 23.

As soon as the heating wedge 25 has reached the welding position, the motor 91 is switched on. The welding device moves with relation to the foils and the pressure rolls 33, 48 which have the same circumferential speed as the actuated transport rolls 8, 9, weld the softened foil areas together into a welding seam.

Because of the angular motion path of the heating wedge 25 it can be removed completely from the area of the foils in the case of a malfunction during the welding process, so that the danger of overheating is eliminated.

While specific embodiments of the invention have been shown and described in detail to illustrate the application of the principles of the invention, it will be understood that the invention may be embodied otherwise without departing from such principles.

What is claimed is:

1. A device for the welding of plastic foils after they are moved into edge overlapping relationship adjacent a heating device for the heating of the foil parts to be welded together, comprising: a carrier; a draw spring acting on said carrier; a pair of a first fixed and a second movable pressure roll for the creation of a welding pressure and between which the foil parts to be joined are moved, said second pressure roll being mounted to said carrier, said carrier being movable between said second pressure roll and relative to said first pressure roll for adjustment in the width of a gap; a spring mechanism; a pressure device supported on said spring mechanism, said pressure device including a first regulating mechanism for setting of the width of the overlapping gap while said spring mechanism is relaxed, and a second regulating mechanism for regulating the welding pressure said second regulating mechanism being arranged on said first regulating mechanism and being movable with said first regulating mechanism each of said regulating mechanisms having an eccentric element provided for said regulation, one of said eccentric elements comprising a hollow eccentric shaft, a regulating shaft connected with the other of said eccentric elements being located in said hollow eccentric shaft.

2. A device according to claim 1, wherein said eccentric shaft has a flange connected thereto with an annular gear on its outer face and having a plurality of receiving recesses, said regulating shaft having a swivelable lever with a stopper which engages in a selected recess.

3. A device according to claim 2, wherein said flange has a scale, said lever having a pointer or a mark.

4. A device according to claim 1, including a pressure element mounted on said eccentric shaft journal which is connected with said regulating shaft, said pressure element having a leaf spring bundle which is arranged on said carrier and forms a bridge structure thereon, a spring on said carrier maintaining said leaf spring bundle in contact with said pressure element.

5. A device according to claim 2, wherein said movable fastening of an eccentric shaft includes a binding screw having a knurl provided on the surface of said flange.

6. A device according to claim 5, wherein each of said pressure rolls includes a shaft contained in an adjustable swivel ball bearing.

* * * * *